United States Patent
Gspaltl et al.

(10) Patent No.: US 6,517,758 B1
(45) Date of Patent: *Feb. 11, 2003

(54) PROCESS FOR THE PRODUCTION OF CELLULOSIC MOULDED BODIES

(75) Inventors: Peter Gspaltl, Grambach (AT); Christian Schlossnikl, Vöcklabruck (AT); Johann Kalleitner, Schörfling (AT); Heinrich Firgo, Vöcklabruck (AT)

(73) Assignee: Lenzing Aktiengesellschaft, Lenzing (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,129

(22) Filed: Jan. 28, 2000

Related U.S. Application Data

(63) Continuation of application No. PCT/AT99/00143, filed on Jun. 4, 1999.

(30) Foreign Application Priority Data

Jun. 4, 1998 (AU) .............................................. 957/98

(51) Int. Cl.$^7$ .............................................. B29C 47/88
(52) U.S. Cl. ............ 264/187; 264/211.13; 264/DIG. 62
(58) Field of Search ...................... 264/177.17, 177.18, 264/187, 211.13, 232, 234, 238, 340, 345, DIG. 48, DIG. 62, 45.3, 48, 569, 558, 563, 565

(56) References Cited

U.S. PATENT DOCUMENTS

| | | | | |
|---|---|---|---|---|
| 4,246,221 A | * | 1/1981 | McCorsley, III | |
| 4,354,938 A | * | 10/1982 | Walch et al. | |
| 4,851,014 A | * | 7/1989 | Jeanes | |
| 5,607,639 A | * | 3/1997 | Zikeli et al. | |
| 5,628,942 A | * | 5/1997 | Lai et al. | |
| 5,658,525 A | * | 8/1997 | Kajiwara et al. | |
| 5,902,532 A | * | 5/1999 | Pitowski | |
| 5,906,742 A | * | 5/1999 | Wang et al. | |
| 5,968,434 A | | 10/1999 | Zikeli et al. | |
| 5,993,710 A | * | 11/1999 | Weigel et al. | |
| 6,019,925 A | * | 2/2000 | Diamantoglou et al. | |
| 6,113,842 A | | 9/2000 | Weigel et al. | |
| 6,165,401 A | * | 12/2000 | Schlossnikl et al. | |

FOREIGN PATENT DOCUMENTS

| | | | |
|---|---|---|---|
| DE | 100 25 230 A1 | * | 11/2000 |
| EP | 0 042 517 B1 | * | 4/1984 |
| EP | 0 807 460 A1 | * | 11/1997 |
| GB | 2 199 786 A | * | 7/1988 |
| WO | WO 93/19230 | * | 9/1993 |
| WO | WO 95/07811 | * | 3/1995 |
| WO | WO 96/20301 | * | 7/1996 |

* cited by examiner

Primary Examiner—Mark Eashoo
(74) Attorney, Agent, or Firm—Baker Botts L.L.P.

(57) ABSTRACT

The invention relates to a process for the production of cellulosic moulded bodies in the form of flat or tubular films and cellulosic membranes in the form of flat or tubular films whereby a solution of cellulose in an aqueous tertiary amine oxide is extruded using an extrusion nozzle whereby the solution can as the case may be also contain additives such as stabilizing and softening agents, pore formers and so on whereby a moulded solution results which has two surfaces and the extruded moulded solution is led over a gap into a precipitation bath and drawn off from the precipitation bath. The process in accordance with the invention is characterized in that the two surfaces of the moulded solution in the gap are each exposed to at least one gaseous medium whereby the medium to which the first surface is exposed differs from the medium to which the second surface is exposed in composition, properties and/or the state of motion.

11 Claims, No Drawings

PROCESS FOR THE PRODUCTION OF CELLULOSIC MOULDED BODIES

This is a continuation of copending application No. PCT/AT99/00143 filed Jun. 4, 1999 which is incorporated by reference herein.

BACKGROUND OF THE INVENTION

The invention relates to a process for the production of cellulosic moulded bodies, flat and tubular films and cellulosic membranes in the form of flat or tubular films whereby a solution of cellulose in an aqueous tertiary amine oxide is extruded using an extrusion nozzle whereby the solution can as the case may be also contain additives such as stabilising and softening agents, pore formers and so on whereby a moulded solution results which has two surfaces and the extruded moulded solution is led over a gap into a precipitation bath and drawn off from the precipitation bath.

Processes for the production of cellulosic moulded bodies from solutions of cellulose in an aqueous tertiary amine oxide are well known and are described for example in U.S. Pat. No. 4,246,221 and PCT-WO 93/19230 for example. This well known process is described in the following as the "amine oxide process".

With cellulosic films the pore structure of the film represents a special property. It has a decisive influence on the suitability of the film for various applications, such as for example as a packaging film or for use as a membrane.

In particular flat and tubular films of cellulose with an asymmetric structure are suitable for packaging films with breathing properties and for use as membranes with pressure-driven separation processes such as ultrafiltration, nanofiltration and reverse osmosis. These are characterised in that they are made up of a macroporous layer and a thin fine pored respectively dense skin. When using these as a membrane the macroporous layer assumes a supporting function whilst the actual separation effect is performed via the thin fine pored layer. The comparatively slight thickness of this layer leads to the high permeability of the films, and at the same time high strengths.

Cellulosic flat or tubular films manufactured according to well known processes such as the viscose process, the cuoxam process or more recently the amine oxide process, do not normally have the above-named asymmetric structure.

Thus U.S. Pat. No. 4,354,938 describes a process for the production of tubular films for use as dialysis membranes according to the viscose process in which a film moulded in the form of a tube is stretched by between 40% and 120% prior to drying in the diagonal direction by blowing it up with air which leads to a membrane with the same orientation in the longitudinal and diagonal direction. When converting the dried membranes to the wet state the membranes depicted in this way undergo shrinkage of 0.5–10% in the longitudinal and diagonal direction.

In this document, however, nothing is said about the asymmetric structure of the film.

WO 96/20301 describes a process for the production of cellulosic moulded bodies which is characterised in that a solution, containing cellulose dissolved in amine oxides, is formed in a nozzle and the moulded solution is led through at least two precipitating media, following an air gap, one after the other whereby it is mentioned as an essential point that in the first precipitation medium at least the cellulose coagulates more slowly than in comparison with the last precipitation medium. Solvents are used for the precipitation media which cannot be mixed with each other and can be layered one above the other due to the differences in density.

The moulded bodies depicted in this way have, in relation to their cross-section, an inner area with a high supramolecular order in the form of finely disperse pores whilst an outer area surrounding the inner area has a low supramolecular order with larger heterogeneous voids compared to the inner area. When the moulded bodies are used as a membrane, e.g. in the form of follow fibres or flat membranes, the outer coarsely disperse area acts as a supporting layer whilst the finely disperse inner area performs the actual separation. The comparatively low thickness of the inner area results in the high permeability of the moulded body.

Films with a finely pored core and coarsely disperse outer layers are only poorly suited to separation processes such as ultrafiltration and reverse osmosis since this can very quickly result in the blocking of the pores on the feed side. In these processes it is common to use an asymmetric membrane comprising a dense skin and a large pored body whereby the dense skin always faces the feed side. In pressure-driven processes of this kind a corresponding Cross-Flow minimises the formation of a polarisation of the concentration and therefore a layer of gel on the membrane surface by means of which the flow through the membrane can be kept at a high level over a long period of time. In the event that the outer layer of the membrane turned to the feed side has a coarser structure than the core, a Cross-Flow is not effective. The particles to be separated cannot be transported away from the membrane surface and they choke the pores.

Keeping the NMMO content of the precipitation bath constant during the process is well known in the amine oxide process, which is performed in practise by the permanent supply of a corresponding amount of fresh precipitation agent respectively wash water. This would appear to be very difficult respectively very complicated in the process described as a result of the use of different precipitation media and the fact that they are superimposed.

DE 44 21 482 C2 describes a process for the production of oriented asymmetric cellulose films by spinning non-derivatised cellulose dissolved in amine oxides through a ring nozzle into a precipitation bath whereby the film is blown up by a blowing gas. The asymmetric structure is achieved as a result of the extruded tube being precipitated on the inner and outer side via difference precipitation agents. This produces different coagulation behaviour on the inner and outer side which leads to the asymmetric structure of the films.

The use of different precipitation agents is, however, also costly particularly when other precipitation agents are used as water or additives are added to the precipitation agents.

EP 0 042 517 B1 describes a process for the production of dialysis membranes of regenerated cellulose in the form of flat films, tubular films and hollow fibres, in which a mixture of completely or partly substituted cellulose, tertiary amine oxide and as the case may be up to 25 weight percentage of a non cellulose dissolving diluting agent and up to 10 weight percentage of usual additives was dissolved in a double screw extruder in less than 8 min at temperatures between 80 and 150° C., the solution is extruded into a precipitation bath using a corresponding forming tool and the coagulated moulded body is dried after washing and treating with glycerine taking care to avoid shrinkage. The dialysis membranes described have a high dialytic permeability in the middle molecular range which remains intact in the main even when the hydraulic permeability for water is drastically reduced by a subsequent treatment. This subsequent treatment is carried out by the membrane being exposed to a raised temperature for some time in aqueous liquids prior to drying.

However, no asymmetric structure is described of the products manufactured.

In EP 0 807 460 A1 a process is described for the production of cellulosic dialysis membranes in the form of flat, tubular or hollow fibre membranes by spinning a solution of cellulose and/or modified cellulose in an aqueous tertiary amnine oxide and other additives such as stabilising agents. pore formers etc. whereby the drawing-off speed equals at least 30 m/min and according to this membranes can be produced for the high, middle and low flux area. The deliberate influencing of the pore structure of the membranes is achieved in this process primarily by using substituted cellulose respectively the addition of various additives and a subsequent treatment and is thus costly.

The production of asymmetric membranes according to this process is not, however, described.

SUMMARY OF THE INVENTION

It is an object of the present invention to make a process available with which the pore structure of films respectively membranes produced according to the amine oxide process can be deliberately influenced. In particular it is the task of the invention to make a process available with which films or membranes can be obtained with an asymmetric structure.

The object of the present invention is resolved by a process as described at the beginning which is characterised in that the two surfaces of the moulded solution in the gap are each exposed to at least one gaseous medium whereby the medium, to which the first surface is exposed, is different to the medium to which the second surface is exposed in terms of the composition, properties and/or state of motion.

DETAILED DESCRIPTION OF THE PREFERRED EMBODIMENTS

In this context in the extrusion through an elongated extrusion die the two surfaces of the formed flat solution are meant by the "Surfaces" and with regard to extrusion through a ring-shaped extrusion dies the inner side respectively the outer side of the formed tubular-shaped moulded solution.

By "gap"—as is known as such from the amine oxide process—one means the gap between the extrusion die and the precipitation bath through which the formed solution is led. The gap comprises a gaseous medium which is mostly inert with relation to the formed solution, i.e. which does not precipitate the cellulose. Air, nitrogen and other gases are suitable as gaseous media. For the purpose of the present invention the term "gaseous medium" also covers mixtures of gas and liquids, e.g. air enriched with water steam or saturated air respectively aerosols.

The gaseous media, to which the two surfaces of the moulded solution are exposed, can differ in their composition and/or their properties and/or their state of motion.

In relation to the term "composition" differences in the medium itself (e.g. air or oxygen on one surface of the solution, nitrogen on the other surface of the solution), different gas blends on both surfaces of the film and e.g. different moisture contents are worth considering. For the purpose of the present invention with the term "moisture content" not only the content of water is meant but also the content of other liquids, e.g. an alcohol, in the gaseous medium.

The temperature can be named in particular as a property in which the gaseous media can differ.

Different states of motion of the gaseous media are achieved when e.g. the gaseous media are led to the surfaces with different speeds in each case or in different quantities.

In the following the measure in accordance with the invention which exposes two surfaces of the formed solution to gaseous media which are different in relation to the given parameters is defined as an "irregular treatment".

It has been shown that an irregular treatment of the surfaces of the moulded solution leads to moulded bodies such as films respectively membranes which have different pore structures on both surfaces of the film respectively membrane.

This is surprising since this result can be achieved with relatively small means. From the state of the art in relation to asymmetric films on the other hand only more complicated measures are known such as the provision of different precipitation agents for the inner and outer side of a tubular-shaped extruded solution.

For the production of flat films in particular where the provision of different precipitation agents for the two surfaces would be very difficult to achieve in technical terms the process in accordance with the invention offers a favourable economic and efficient solution to this problem.

The gaseous media preferably differ with regard to their temperature and/or their moisture content.

In another preferred embodiment of the invention the moulded solution is exposed to a stream of gaseous medium on at least one surface.

The supply of a stream of gaseous medium, e.g. air, to the moulded solution is thereby known from the state of the art for example from PCT-WO 93/19230 or PCT-WO 95/07811.

The gaseous medium can be led to the moulded solution basically in a right angle to the direction of extrusion. It is, however, also possible to let the gaseous medium flow along the moulded solution and/or draw this off by suction. In the following all of these terms are to be described by the term "blowing".

The moulded solution can be exposed to streams of gaseous media on both surfaces. In this case the effect in accordance with the invention is achieved when the media differ in their composition, their properties and/or amount or speed with which they are led.

The moulded solution is preferably only exposed to the stream of a Gaseous medium on one surface. This embodiment, which is particularly favourable with regard to the production of cellulosic flat films, is designated as "one-sided blowing" in the following.

As a result of one sided blowing films respectively membranes can be produced with an asymmetric pore structure in a particularly efficient way. Furthermore as a result of varying the blowing conditions the extent of asymmetry can be deliberately influenced.

In this connection it turned out to be particularly favourable when the gaseous medium which is blown onto the first surface of the moulded solution displays another composition and/or properties than the gaseous medium to which the second surface of the moulded solution is exposed.

Thus it is possible to expose a surface of the formed solution to what is basically a static gaseous medium. e.g. conditioned air, whilst the other surface is blown up with air with an increased moisture content and/or increased temperature.

In this respect it can be seen in particular that the blowing with dry air at a lower temperature leads to a denser structure of the surface onto which air is blown whilst in what are otherwise the same conditions the blowing with air warmed up with a higher moisture content (e.g. saturated steam) leads to higher porosities.

For the process in accordance with the invention air, nitrogen or the steam of another solvent, e.g. methanol, are particularly well suited as gaseous media.

If air is used as a gaseous medium, the moisture of the air can lie within a range of 0% to 100%.

The temperatures of the gaseous media lie in the range of −20° C. to +120° C.

The extruded solution can be stretched in the air gap in the manner known by setting the speed of the drawing-off of the solution higher than the extrusion speed. It is also possible not to stretch the extruded solution or to draw it off at a speed which is slower than the speed of extrusion.

The extruded solution respectively the precipitated moulded body can also be subjected to stretching diagonal to the direction of extrusion. This diagonal stretching can be performed in the air gap after entering the precipitation bath, during rinsing or even after drying whilst re-dampening.

If the solution is extruded through an extrusion die with an elongated extrusion gap this results in cellulosic flat films. To produce cellulosic tubular films the solution is extruded through an extrusion die with a ring-shaped extrusion gap.

With the process in accordance with the invention cellulosic films respectively membranes can be obtained with a different pore structure on the two surfaces of the film respectively membrane. These products are ideal for a vide range of different applications, e.g. in the packaging area or in membrane technology.

The invention is described in greater detail in the following:

The ultrafiltration rate given in the examples is defined as the permeate volume through the membrane wall per unit of time in relation to the membrane surface and the test pressure.

$$UFR = \frac{V}{t \cdot A \cdot p} \quad \frac{ml}{h \cdot m^2 \cdot mm\ Hg}$$

V=volume of liquid (permeate) [ml]
t=time [h]
A=membrane surface [m$^2$]
p=test pressure [mm Hg]

The diffuse permeabilities indicated are derived by applying $\ln(c_t/c_o)$ against the time from the ascending gradient of the straight lines.

$$\ln\frac{c_1}{c_0} = -\frac{A}{V} \cdot P_{diff} \cdot t$$

$c_o$=starting concentration
$c_t$=concentration at the time t
A=membrane surface [cm$^2$]
V=dialysis volume [cm$^3$]
$P_{diff}$=diffuse permeability [cm/min]
t=time [min]

EXAMPLE 1

A cellulose solution with a temperature of 95° C. containing 15 weight percentage cellulose, 74.5 weight percentage NMMO and 10.5 weight percentage water was extruded using a flat die which had an extrusion gap of 40 cm length and a width of 300 μm with a throughput of 37.8 kg/h through an air gap of 20 mm into a precipitation bath comprising 80 weight percentage of NMMO and 20 weight percentage of water.

The cellulose solution which was moulded as a flat film emerged from the die with an emergence speed of 4.2 m/min and was drawn off at the same speed. This means that the flat film in the air gap was not stretched in the longitudinal direction.

The film was washed, led through a bath with 150 g/l of glycerine as a softening agent and finally dried whilst preventing shrinkage.

The following membrane properties were detected:

| | |
|---|---|
| Thickness in dry state (μm) | 97 |
| UFR water (ml/h.m$^2$.mm Hg) | 5.67 |
| $P_{diff}$ NaCl (cm/min) | 4.1 × 10$^{-3}$ |
| $P_{diff}$ NaOH (cm/min) | 5.3 × 10$^{-3}$ |

EXAMPLE 2

The procedure was the same as in example 1 however one surface of the solution moulded as a flat film was blown across the entire width 10 mm after the die exit using flat spray dies with 47 m3/h of air (relative moisture 50%, 20° C.).

The following membrane properties were detected:

| | |
|---|---|
| Thickness in dry state (μm) | 98 |
| UFR water (ml/h.m$^2$.mm Hg) | 9.43 |
| $P_{diff}$ NaCl (cm/min) | 5.8 × 10$^{-3}$ |
| $P_{diff}$ NaOH (cm/min) | 1.3 × 10$^{-2}$ |

The example shows that the one-sided blowing with air leads to an increase in porosity of the blown surface which is reflected in the increased permeabilities compared to example 1.

EXAMPLE 3

The procedure was the same as in example 1, however the solution formed as a flat film was drawn off with three times the emergence speed.

The following membrane properties were found:

| | |
|---|---|
| Thickness in dry state (μm) | 25 |
| UFR water (ml/h.m$^2$.mm Hg) | 4.82 |
| $P_{diff}$ NaCl (cm/min) | 2.3 × 10$^{-3}$ |
| $P_{diff}$ NaOH (cm/min) | 6.62 × 10$^{-2}$ |

EXAMPLE 4

The procedure was the same as in example 3 however one surface of the solution formed as a flat film was blown with air 10 mm after the exit from the die using fan jet dies with 47 m$^3$/h with air at 100° C. and 100% moisture across the entire width.

The following membrane properties were detected:

| | |
|---|---|
| Thickness in dry state ($\mu$m) | 27 |
| UFR water (ml/h.m².mm Hg) | 12.02 |
| $P_{diff}$ NaCl (cm/min) | $6.2 \times 10^{-3}$ |
| $P_{diff}$ NaOH (cm/min) | $1.0 \times 10^{-2}$ |

The example shows that one-sided blowing leads to an increase in the porosity of the blown surface which is reflected in the higher permeabilities compared to example 3.

What is claimed is:

1. A process for the production of a cellulosic flat film comprising:
   providing a solution comprising cellulose in an aqueous tertiary amine oxide,
   extruding the solution through an elongated extrusion die whereby a flat moulded solution results which has a first surface and a second surface, and
   conveying the extruded moulded solution through a gap such that the first surface is exposed to a first gaseous medium and the second surface is exposed to a second gaseous medium, wherein the first gaseous medium differs from the second gaseous medium in terms of at least one feature selected from the group consisting of composition, properties and state of motion;
   conveying the extruded moulded solution into a precipitation bath thereby forming a film; and
   drawing the film off from the precipitation bath.

2. Process according to claim 1 wherein the gaseous media differ in terms of at least one selected from the group consisting of temperature and moisture content.

3. Process according to any one of claim 1 or claim 2 wherein the moulded solution is exposed to a stream of gaseous medium on at least one surface.

4. Process according to claim 3 wherein the moulded solution is exposed to streams of gaseous medium on both surfaces.

5. Process according to claim 3 wherein the moulded solution is exposed to a stream of gaseous medium on only one surface.

6. Process according to claim 1 wherein the solution of cellulose includes at least one additive.

7. Process according to claim 6 wherein the at least one additive is selected from the group consisting of stabilizing agents, softening agents and pore formers.

8. The process of claim 1, further comprising exposing the first surface to one or more additional gaseous medium, each of which differs from the first gaseous medium in terms of at least one feature selected from the group consisting of composition, properties and state of motion.

9. The process of claim 8, further comprising exposing the second surface to one or more additional gaseous medium, each of which differs from the second gaseous medium in terms of at least one feature selected from the group consisting of composition, properties and state of motion.

10. The process of claim 1, further comprising exposing the second surface to one or more additional gaseous medium, each of which differs from the second gaseous medium in terms of at least one feature selected from the group consisting of composition, properties and state of motion.

11. A process for the production of a cellulosic flat film comprising:
   providing a solution comprising cellulose in an aqueous tertiary amine oxide;
   extruding the solution through an elongated extrusion die whereby a flat moulded solution results which has a first surface and a second surface;
   conveying the extruded moulded solution through a gap;
   treating the extruded moulded solution, as it passes through the gap, with a gas directed toward the solution such that the first surface of the solution is exposed to a first gaseous medium and the second surface is exposed to a second gaseous medium, wherein the first gaseous medium differs from the second gaseous medium in terms of at least one feature selected from the group consisting of composition, properties and state of motion;
   conveying the extruded moulded solution into a precipitation bath thereby forming a film; and
   drawing the film off from the precipitation bath.

* * * * *

UNITED STATES PATENT AND TRADEMARK OFFICE
CERTIFICATE OF CORRECTION

PATENT NO. : 6,517,758 B1
DATED : February 11, 2003
INVENTOR(S) : Gspaltl et al.

It is certified that error appears in the above-identified patent and that said Letters Patent is hereby corrected as shown below:

<u>Title page,</u>
Item [30], Foreign Application Priority Data, "Jun. 4, 1998 (AU)" should read -- Jun. 4, 1998 (AT) --

Signed and Sealed this

Fourth Day of November, 2003

JAMES E. ROGAN
*Director of the United States Patent and Trademark Office*